United States Patent
Jeong

(10) Patent No.: US 9,215,515 B2
(45) Date of Patent: Dec. 15, 2015

(54) APPARATUS AND METHOD FOR OBSERVING PHYSICAL PHENOMENON IN OCEAN AND ATMOSPHERE

(71) Applicant: ELECTRONICS AND TELECOMMUNICATIONS RESEARCH INSTITUTE, Daejeon (KR)

(72) Inventor: Cheol Oh Jeong, Gyeonggi-do (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/138,263

(22) Filed: Dec. 23, 2013

(65) Prior Publication Data

US 2014/0245828 A1    Sep. 4, 2014

(30) Foreign Application Priority Data

Dec. 26, 2012 (KR) .................. 10-2012-0153191

(51) Int. Cl.
  *G01W 1/00*   (2006.01)
  *H04Q 9/00*   (2006.01)
(52) U.S. Cl.
  CPC ........... *H04Q 9/00* (2013.01); *H04Q 2209/823* (2013.01); *H04Q 2209/826* (2013.01)
(58) Field of Classification Search
  USPC ...................................... 73/170.16
  See application file for complete search history.

(56) References Cited

U.S. PATENT DOCUMENTS

| | | | | |
|---|---|---|---|---|
| 5,361,072 | A * | 11/1994 | Barrick et al. | 342/133 |
| 6,084,510 | A * | 7/2000 | Lemelson et al. | 340/539.13 |
| 7,834,754 | B2 * | 11/2010 | Kulesz et al. | 340/506 |
| 8,229,467 | B2 * | 7/2012 | Root et al. | 455/456.2 |
| 8,634,814 | B2 * | 1/2014 | Root et al. | 455/414.3 |
| 8,832,121 | B2 * | 9/2014 | Smith et al. | 707/751 |
| 8,909,679 | B2 * | 12/2014 | Root et al. | 707/803 |
| 2006/0161469 | A1 * | 7/2006 | Root et al. | 705/9 |
| 2006/0187017 | A1 * | 8/2006 | Kulesz et al. | 340/506 |
| 2011/0234447 | A1 * | 9/2011 | Patrick et al. | 342/44 |
| 2011/0267219 | A1 * | 11/2011 | Kisliansky et al. | 342/90 |
| 2012/0119938 | A1 * | 5/2012 | Abe et al. | 342/107 |
| 2014/0137644 | A1 * | 5/2014 | Root et al. | 73/170.16 |

FOREIGN PATENT DOCUMENTS

| | | |
|---|---|---|
| JP | 2003-067900 A | 3/2003 |
| KR | 2020060016975 B1 | 6/2006 |
| KR | 100820951 B1 | 4/2008 |
| KR | 1020120117006 A | 10/2012 |

* cited by examiner

*Primary Examiner* — Lisa Caputo
*Assistant Examiner* — Jamel Williams
(74) *Attorney, Agent, or Firm* — Ladas & Parry LLP

(57) ABSTRACT

Provided is an apparatus and method for observing a physical phenomenon in the ocean and the atmosphere, the observation apparatus including an observation signal receiving unit to receive an observation signal indicating a physical phenomenon of an observation object, a physical quantity determining unit to determine a physical quantity of the observation object, using the observation signal, and a frequency determining unit to determine whether an observation frequency is to be changed, based on the physical quantity of the observation object.

15 Claims, 4 Drawing Sheets

APPARATUS AND METHOD FOR OBSERVING PHYSICAL PHENOMENON IN OCEAN AND ATMOSPHERE

CROSS-REFERENCE TO RELATED APPLICATION

This application claims the benefit of Korean Patent Application No. 10-2012-0153191, filed on Dec. 26, 2012, in the Korean Intellectual Property Office, the disclosure of which is incorporated herein by reference.

BACKGROUND

1. Field of the Invention

The present invention relates to an apparatus and method for observing a physical phenomenon in the ocean and the atmosphere, and more particularly, to an observation apparatus and method that may perform ocean monitoring, for example, monitoring of earthquakes, tidal waves, illegal fishing vessels, and the like, atmosphere monitoring, for example, monitoring of gales, regional torrential rains, and the like, and monitoring of a change in the terrestrial ionosphere.

2. Description of the Related Art

Recently, occurrences of natural disasters have been increasing due to global environmental changes. In particular, earthquakes occur more frequently as a global activity becomes more active. Further, the earthquakes are accompanied by secondary effects, for example, tsunamis, which cause a loss of life and property damage. In addition, an unusual change in the atmosphere brings sudden gales causing more damage.

For example, earthquakes occur frequently in a northeastern region of Japan and throughout Indonesia, and tsunamis accompanying the earthquakes lead to an increased loss of life and property damage. In order to minimize such losses, a number of countries have installed and operate tsunami observation facilities in coastal areas.

As an example, an observation apparatus may observe a tide of a tsunami, a wave height, a wind direction, and the like within a 200 kilometer (km) distance from the observation apparatus, using a single transmitting antenna and a single receiving antenna. In this instance, an observation frequency of 5 megahertz (MHz) to 6 MHz may be used and thus, the observation apparatus may be affected by noise occurring on land. Accordingly, precision of an observation may decrease.

As another example, an observation apparatus may observe a change in a state of an observation object occurring within a 30 km to 40 km distance from the observation apparatus, using a single transmitting antenna and a plurality of receiving antennas. In this instance, an observation frequency of 27 MHz to 40 MHz may be used and thus, the observation apparatus may receive an observation signal in a limited range of 170 degrees to 180 degrees. Accordingly, an observation range may decrease.

Accordingly, there is a demand for a technology for wider and more precise observation of a change in a state of an observation object occurring in the oceans and the atmosphere, for example, a tsunami, a gale, and the like, in particular, an observation technology for increasing an observation precision and expanding an observation range.

SUMMARY

An aspect of the present invention provides an observation apparatus and method that may expand a range for observing a change in a state of an observation object occurring in oceans and the atmosphere. by varying an observation frequency.

Another aspect of the present invention also provides an observation apparatus and method that may more precisely observe a change in a state of an observation object, by varying an observation frequency.

According to an aspect of the present invention, there is provided an observation apparatus, including an observation signal receiving unit to receive an observation signal indicating a physical phenomenon of an observation object, a physical quantity determining unit to determine a physical quantity of the observation object, using the observation signal, and a frequency determining unit to determine whether an observation frequency is to be changed, based on the physical quantity of the observation object.

The frequency determining unit may change the observation frequency to a high frequency when a distance from the observation apparatus to the observation object is less than a reference distance, and maintain the observation frequency or change the observation frequency to a low frequency when the distance from the observation object is greater than or equal to the reference distance.

The frequency determining unit may change the observation frequency to a high frequency when a height of the observation object is greater than or equal to a reference height, and maintain the observation frequency or change the observation frequency to a low frequency when the height of the observation object is less than the reference height.

The frequency determining unit may change the observation frequency to a high frequency when the physical quantity of the observation object is changed, and maintain the observation frequency or change the observation frequency to a low frequency when the physical quantity of the observation object is not changed.

The frequency determining unit may maintain the observation frequency, or change the observation frequency to a high frequency or a low frequency based on at least one of the distance from the observation apparatus to the observation object, the height of the observation object, and a change in the physical quantity of the observation object.

In a case in which the physical quantity of the observation object is not changed, the frequency determining unit may change the observation frequency to a high frequency when at least one of that the distance from the observation object is less than the reference distance and that the height of the observation object is greater than or equal to the reference height is satisfied.

The frequency determining unit may increase an observation precision, or expand an observation range of the observation object by changing the observation frequency.

The physical quantity determining unit may determine the physical quantity of the observation object by analyzing an amplitude and a phase of the observation signal.

The physical quantity determining unit may determine the physical quantity of the observation object, based on at least one of a receiving time, an intensity, and a pattern of the observation signal transmitted by a sensor apparatus sensing the observation object.

The physical quantity of the observation object may include at least one of a velocity, a density, and a direction of the observation object.

According to another aspect of the present invention, there is also provided an observation method, including receiving an observation signal indicating a physical phenomenon of an observation object, determining a physical quantity of the observation object, using the observation signal, and determining whether an observation frequency is to be changed, based on the physical quantity of the observation object.

The determining of whether the observation frequency is to be changed may include changing the observation frequency to a high frequency when a distance from the observation apparatus to the observation object is less than a reference distance, and maintaining the observation frequency or changing the observation frequency to a low frequency when the distance from the observation object is greater than or equal to the reference distance.

The determining of whether the observation frequency is to be changed may include changing the observation frequency to a high frequency when a height of the observation object is greater than or equal to a reference height, and maintaining the observation frequency or changing the observation frequency to a low frequency when the height of the observation object is less than the reference height.

The determining of whether the observation frequency is to be changed may include changing the observation frequency to a high frequency when the physical quantity of the observation object is changed, and maintaining the observation frequency or changing the observation frequency to a low frequency when the physical quantity of the observation object is not changed.

The determining of whether the observation frequency is to be changed may include maintaining the observation frequency, or changing the observation frequency to a high frequency or a low frequency based on at least one of the distance from the observation apparatus to the observation object, the height of the observation object, and a change in the physical quantity of the observation object.

The determining of whether the observation frequency is to be changed may include determining whether the physical quantity of the observation object is changed, determining whether at least one of the distance from the observation object being less than the reference distance and the height of the observation object being greater than or equal to the reference height is satisfied, when it is determined that the physical quantity of the observation object is not changed, and changing the observation frequency to a high frequency when it is determined that at least one of that the distance from the observation object is less than the reference distance and that the height of the observation object is greater than or equal to the reference height is satisfied.

The determining of whether the observation frequency is to be changed may include increasing an observation precision, or expanding an observation range of the observation object by changing the observation frequency.

The determining of the physical quantity may include determining the physical quantity of the observation object by analyzing an amplitude and a phase of the observation signal.

The determining of the physical quantity may include determining the physical quantity of the observation object, based on at least one of a receiving time, an intensity, and a pattern of the observation signal transmitted by a sensor apparatus sensing the observation object.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
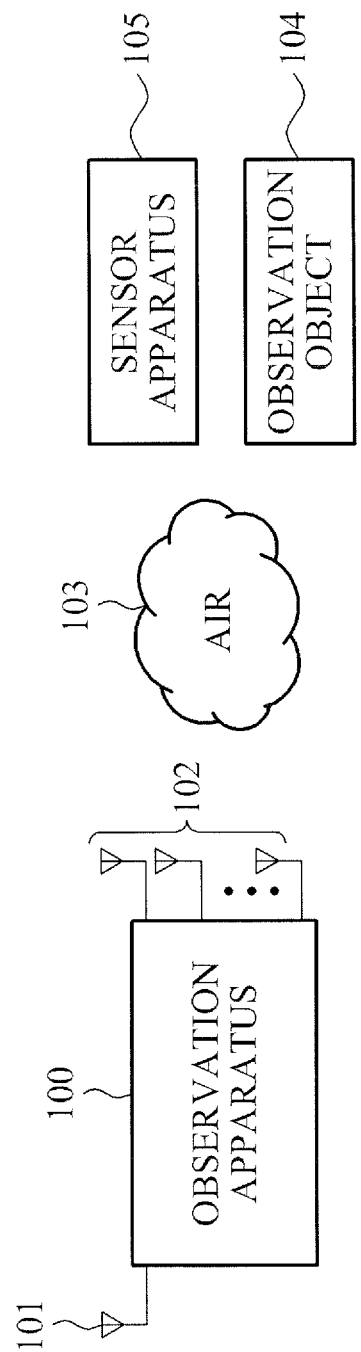
FIG. 1 is a diagram illustrating a relationship between an observation apparatus and a sensor apparatus according to an embodiment of the present invention.

Reference will now be made in detail to exemplary embodiments of the present invention, examples of which are illustrated in the accompanying drawings, wherein like reference numerals refer to the like elements throughout. An observation method according to an embodiment may be performed by an observation apparatus. Exemplary embodiments are described below to explain the present invention by referring to the figures.

FIG. 1 is a diagram illustrating a relationship between an observation apparatus 100 and a sensor apparatus 105 according to an embodiment of the present invention.

Referring to FIG. 1, the observation apparatus 100 may observe a change in a state of an observation object 104, using a single transmitting antenna 101 and a plurality of receiving antennas 102.

Here. the observation object 104 may refer to a natural phenomenon causing a disaster occurring in at least one of an ocean and the atmosphere. For example, the observation object 104 may include a tidal wave, a tsunami, a typhoon, a wave height, a wind, a tide, and the like occurring in the ocean, and include a gale, a regional torrential rain, an air current of an ionosphere, and the like occurring in the atmosphere.

In particular, the observation apparatus 100 may radiate, into the air 103, a transmission signal to be used for observing the observation object 104.

As an example, in order to observe a change in a state of the observation object 104 occurring in the ocean, the observation apparatus 100 may radiate the transmission signal toward the ocean through the transmitting antenna 101.

As another example, in order to observe a change in a state of the observation object 104 occurring in the atmosphere, the observation apparatus 100 may radiate the transmission signal toward the atmosphere through the transmitting antenna 101.

The sensor apparatus 105 may sense a physical phenomenon of the observation object 104, using the transmission signal.

The sensor apparatus 105 may transmit, to the observation apparatus 100, an observation signal indicating the sensed physical phenomenon of the observation object 104. For example, in order to sense a physical phenomenon of the observation object 104 occurring in the ocean, the sensor apparatus 105 may be disposed around the observation object 104, or installed at a coastline, a beach scarp, and the like from which the seashore is visible. In addition, in order to sense a physical phenomenon of the observation object 104 occurring in the atmosphere, the sensor apparatus 105 may be installed in a predetermined terrestrial space in which a clear view for observing an atmospheric phenomenon is secured.

The observation apparatus 100 may receive the observation signal through the plurality of antennas 102.

The observation apparatus 100 may determine a physical quantity of the observation object 104, by analyzing the observation signal using a data analysis algorithm. Here, the data analysis algorithm may refer to an algorithm for determining, for each observation object, a physical quantity of an observation object corresponding to an observation signal, based on a physical property of the observation object.

As an example, when the observation object 104 corresponds to a tsunami, the data analysis algorithm may be programmed to determine a physical quantity of the observation object 104 corresponding to the observation signal being an input parameter, based on a physical property of a tsunami.

As another example, when the observation object 104 corresponds to a gale, the data analysis algorithm may be programmed to determine a physical quantity of the observation object 104 corresponding to the observation signal being an input parameter, based on a physical property of a gale. Here, the physical quantity of the observation object may correspond to an output parameter. A process of determining a physical quantity of an observation object by analyzing an observation signal will be further described with reference to FIG. 3.

The observation apparatus 100 may determine whether an observation frequency is to be changed, based on the determined physical quantity of the observation object 104. Here, the observation frequency may refer to a frequency used to radiate the transmission signal. For example, the observation frequency may include a frequency in a range of 5 megahertz (MHz) to 15 MHz. Hereinafter, a process of determining whether an observation frequency is to be changed will be further described with reference to FIG. 2.

Figure 2:
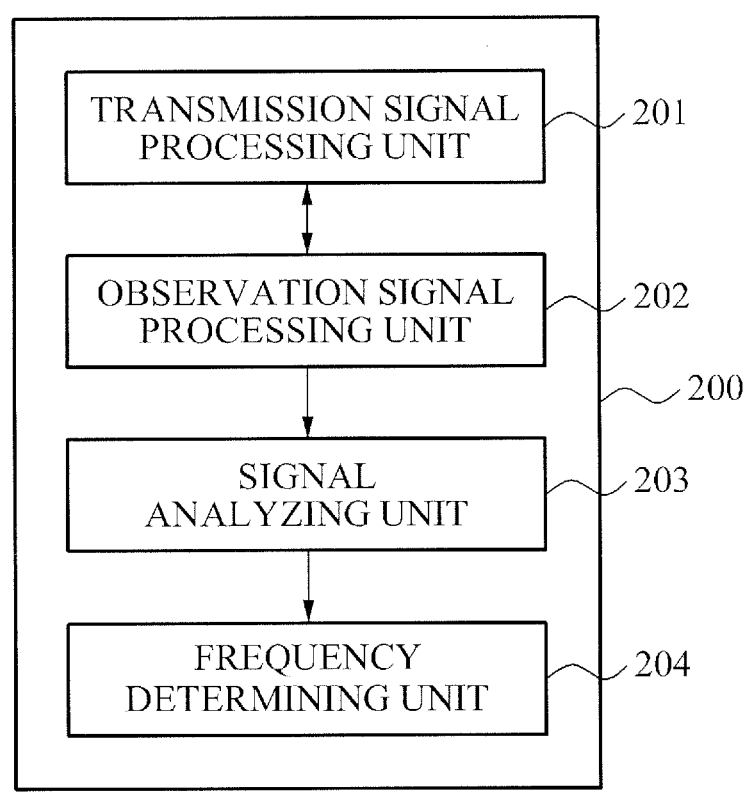
FIG. 2 is a block diagram illustrating an overall operation of an observation apparatus according to an embodiment of the present invention.

FIG. 2 is a block diagram illustrating an overall operation of an observation apparatus 200 according to an embodiment of the present invention.

Referring to FIG. 2, the observation apparatus 200 may include a transmission signal processing unit 201, an observation signal processing unit 202, a signal analyzing unit 203, and a frequency determining unit 204.

The transmission signal processing unit 201 may radiate a transmission signal for observing an observation object. For example, the transmission signal may include a chirp signal.

In this instance, the transmission signal processing apparatus 201 may radiate the transmission signal at every predetermined observation interval, in order to observe the observation object periodically.

The observation signal processing unit 202 may receive, through a plurality of antennas, an observation signal indicating a physical phenomenon of the observation object sensed by a sensor apparatus. For example, the observation signal may include an intensity of a frequency signal sensed by the sensor apparatus, a pattern of the frequency signal, and the like. In this instance, the observation signal processing unit 202 may receive an observation signal corresponding to the transmission signal radiated at every predetermined observation interval. In particular, the observation signal processing unit 202 may receive an observation signal at every observation interval.

The observation signal processing unit 202 may convert the observation signal into a digital signal. The observation signal processing unit 202 may adjust an amplitude and a phase of the observation signal converted into the digital signal. A process of adjusting an amplitude and a phase of a digital signal will be further described with reference to FIG. 3.

The signal analyzing unit 203 may determine a physical quantity of the observation object, using the observation signal of which the amplitude and the phase are adjusted. For example, the signal analyzing unit 203 may determine the physical quantity of the observation object, by analyzing the observation signal of which the amplitude and the phase are adjusted, using a data analysis algorithm. In addition, the signal analyzing unit 203 may store the physical quantity of the observation object. A process of determining a physical quantity of an observation object by analyzing an observation signal will be further described with reference to FIG. 3.

The frequency determining unit 204 may determine whether an observation frequency is to be changed, based on the physical quantity of the observation object. Here, the physical quantity of the observation object may include a velocity, a density, a direction, a height of the observation object, a distance from the observation object, and the like.

In this instance, the frequency determining unit 204 may determine whether the observation frequency is to be changed, based on at least one of the distance from the observation apparatus 200 to the observation object, the height of the observation object, and a change in the physical quantity of the observation object.

As an example, when the distance from the observation object is used, the frequency determining unit 204 may compare the distance from the observation object to a predetermined reference distance. For example, the reference distance may be predetermined based on a value indicating a distance from the observation object, for example, a tsunami, a tidal wave, and the like, within which a disaster and a loss of life occur and thus, an evacuation, and the like may be required.

In this instance, when the distance from the observation object, for example, a tsunami, and the like, is less than the predetermined reference distance, the frequency determining unit 204 may increase the observation frequency. For example, when the distance from the observation object is less than the predetermined reference distance as a result of observing the observation object using an observation frequency of 10 MHz, among frequencies in a range of 5 MHz to 15 MHz, the frequency determining unit 204 may change the observation frequency to a high frequency in a range of 11 MHz to 15 MHz.

When the observation object is positioned close to the observation apparatus 200, the frequency determining unit 204 may change the observation frequency to a high frequency, thereby increasing a precision of an observation with respect to the observation object. In particular, the observation apparatus 200 may observe the observation object more precisely.

When the distance from the observation object is greater than or equal to the predetermined reference distance, the frequency determining unit 204 may lower the observation frequency, or maintain the observation frequency. For example, the frequency determining unit 204 may change the observation frequency to a low frequency in range of 5 MHz to 9 MHz. In this instance, the frequency determining unit 204 may maintain the observation frequency of 10 MHz, without changing the observation frequency to a low frequency.

When the observation object is positioned far from the observation apparatus 200, the frequency determining unit 204 may change the observation frequency to a low frequency or maintain the observation frequency, thereby expanding an observation range with respect to the observation object. In particular, the observation apparatus 200 may observe a distant observation object.

As another example, when the height of the observation object is used, the frequency determining unit 204 may compare the height of the observation object to a predetermined reference height. For example, the reference height may be predetermined based on a danger threshold value indicating a height of the observation object, for example, a tsunami, a tidal wave, and the like, at which a disaster and a loss of life may occur.

In this instance, when the height of the observation object is greater than or equal to the predetermined reference height, the frequency determining unit 204 may increase the observation frequency. For example, the frequency determining unit 204 may change the observation frequency to a high frequency, thereby observing a change in a state of the tsunami more precisely.

When the height of the observation object is less than the predetermined reference height, the frequency determining unit 204 may lower the observation frequency, or maintain the observation object.

As still another example, when the change in the physical quantity is used, the frequency determining unit 204 may determine whether the physical quantity of the observation object is changed. For example, the signal analyzing unit 203 may determine the physical quantity of the observation object at every observation interval, by analyzing the observation signal received at every observation interval. The frequency determining unit 204 may determine whether the physical quantity of the observation object is changed, based on the physical quantity determined at every observation interval.

In this instance, when a difference between a physical quantity determined at a previous observation interval and a physical quantity determined at a current observation interval is within a predetermined margin of error, the frequency determining unit 204 may determine that the physical quantity of the observation object is not changed. In particular, when the difference between the physical quantities is within the predetermined margin of error, the frequency determining unit 204 may determine that the physical quantity determined at the previous observation interval is identical to the physical quantity determined at the current observation interval, and that the physical quantity is not changed.

When it is determined that the physical quantity of the observation object is not changed, the frequency determining unit 204 may maintain the observation frequency, or change the observation frequency to a low frequency.

When the difference between the physical quantity determined at the previous observation interval and the physical quantity determined at the current observation interval is out of the predetermined margin of error, the frequency determining unit 204 may determine that the physical quantity of the observation object is changed.

When it is determined that the physical quantity of the observation object is changed, the frequency determining unit 204 may change the observation frequency to a high frequency.

As yet another example, when the distance from the observation object and the change in the physical quantity are used, the frequency determining unit 204 may determine whether the physical quantity of the observation object is changed.

In this instance, when the distance from the observation object is less than the predetermined reference distance, and the physical quantity is changed, the frequency determining unit 204 may change the observation frequency to a high frequency. thereby observing the observation object more precisely.

When the distance from the observation object is greater than or equal to the predetermined reference distance, and the physical quantity is changed, the frequency determining unit 204 may maintain the observation object, or change the observation object to a high frequency.

When the distance from the observation object is less than the predetermined reference distance, and the physical quantity is not changed, the frequency determining unit 204 may change the observation frequency to a high frequency.

When the distance from the observation object is greater than or equal to the predetermined reference distance, and the physical quantity is not changed, the frequency determining unit 204 may maintain the observation frequency, or change the observation frequency to a low frequency.

As further another example, when the height of the observation object and the change in the physical quantity are used, the frequency determining unit 204 may determine whether the physical quantity of the observation object is changed.

In this instance, when the height of the observation object is greater than or equal to the predetermined reference height, and the physical quantity is changed, the frequency determining unit 204 may change the observation frequency to a high frequency, thereby observing the observation object more precisely.

When the height of the observation object is less than the predetermined reference height, and the physical quantity is changed, the frequency determining unit 204 may maintain the observation object, or change the observation object to a high frequency.

When the height of the observation object is greater than or equal to the predetermined reference height, and the physical quantity is not changed, the frequency determining unit 204 may change the observation frequency to a high frequency.

When the height of the observation object is less than the predetermined reference height, and the physical quantity is not changed, the frequency determining unit 204 may maintain the observation frequency, or change the observation frequency to a low frequency.

As still another example, when the distance from the observation object and the height of the observation object are used, the frequency determining unit 204 may maintain or change the observation frequency, by comparing the distance from the observation object to the predetermined reference distance, and comparing the height of the observation object to the predetermined reference height.

In this instance, when the distance from the observation object is greater than or equal to the predetermined reference distance, and the height of the observation object is greater than or equal to the predetermined reference height, the frequency determining unit 204 may change the observation frequency to a high frequency, thereby observing the observation object more precisely.

When the distance from the observation object is greater than or equal to the predetermined reference distance, and the height of the observation object is less than the predetermined reference height, the frequency determining unit 204 may change the observation object to a high frequency.

Similarly, when the distance from the observation object is less than the predetermined reference distance, and the height of the observation object is greater than or equal to the predetermined reference height, the frequency determining unit 204 may change the observation frequency to a high frequency.

When the distance from the observation object is less than the predetermined reference distance, and the height of the observation object is less than the predetermined reference height, the frequency determining unit 204 may maintain the observation frequency, or change the observation frequency to a low frequency.

As yet another example, the frequency determining unit 204 may maintain or change the observation frequency, using all of the distance from the observation object, the height of the observation object, and the change in the physical quantity.

In this instance, when the physical quantity is not changed, the frequency determining unit 204 may compare the distance from the observation object to the predetermined reference distance, and compare the height of the observation object to the predetermined reference height.

1) When the distance from the observation object is less than the predetermined reference distance, and the height of the observation object is greater than or equal to the predetermined reference height, 2) when the distance from the observation object is greater than or equal to the predetermined reference distance, and the height of the observation object is less than the predetermined reference height, or 3) when the distance from the observation object is greater than or equal to the predetermined reference distance, and the height of the observation object is greater than or equal to the predetermined reference height, the frequency determining unit 204 may change the observation frequency to a high frequency. When the distance from the observation object is less than the predetermined reference distance, and the height of the observation object is less than the predetermined reference height, the frequency determining unit 204 may maintain the observation frequency, or change the observation frequency to a low frequency.

Similarly, when the physical quantity is changed, the frequency determining unit 204 may compare the distance from the observation object to the predetermined reference distance, and compare the height of the observation object to the predetermined reference height.

1) When the distance from the observation object is less than the predetermined reference distance, and the height of the observation object is greater than or equal to the predetermined reference height, 2) when the distance from the observation object is greater than or equal to the predetermined reference distance, and the height of the observation object is less than the predetermined reference height, or 3) when the distance from the observation object is greater than or equal to the predetermined reference distance, and the height of the observation object is greater than or equal to the predetermined reference height, the frequency determining unit 204 may change the observation frequency to a high frequency. When the distance from the observation object is less than the predetermined reference distance, and the height of the observation object is less than the predetermined reference height, the frequency determining unit 204 may maintain the observation frequency, or change the observation frequency to a high frequency.

Figure 3:
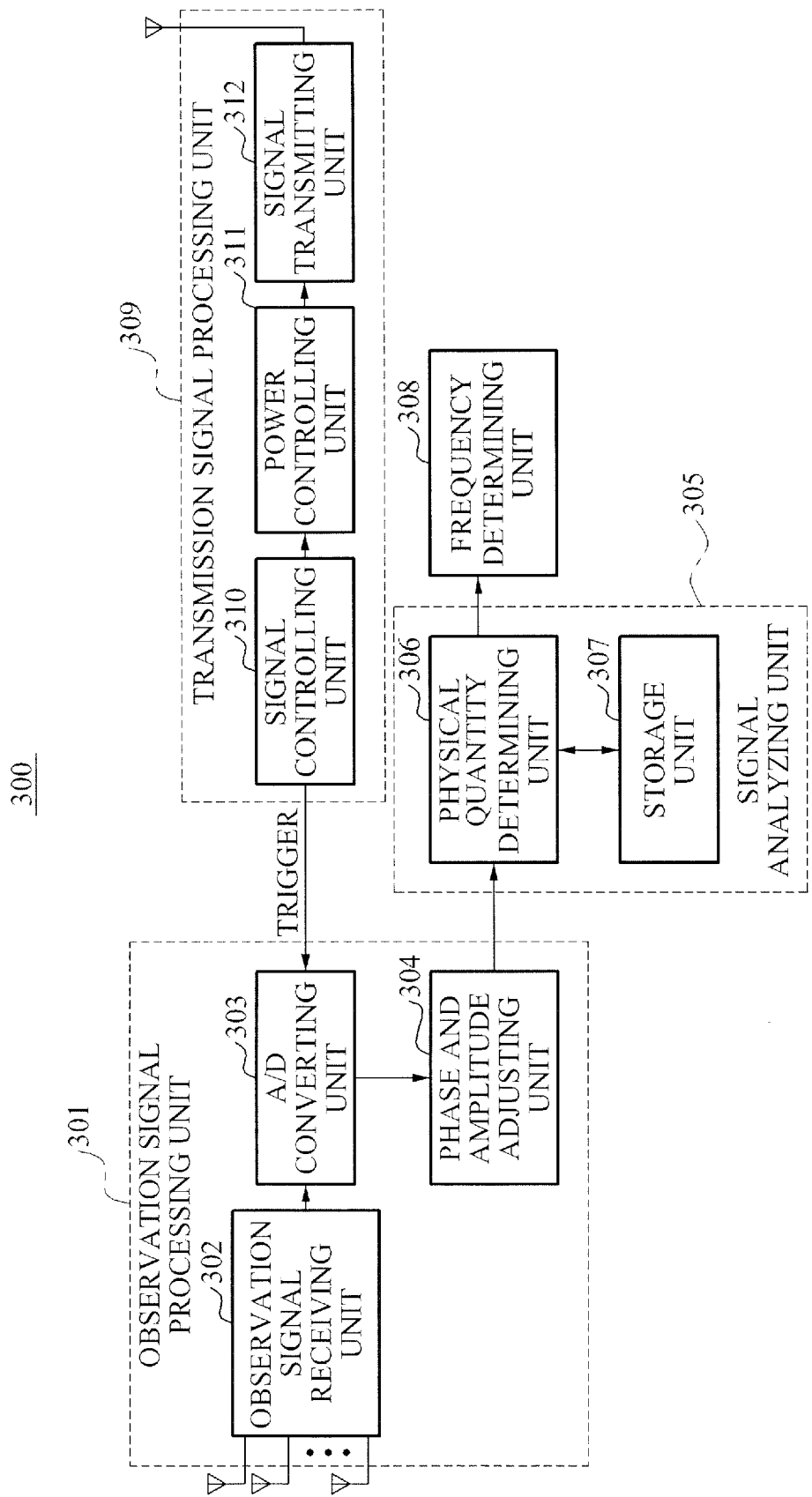
FIG. 3 is a block diagram illustrating a detailed configuration of the observation apparatus of FIG. 1.

FIG. 3 is a block diagram illustrating a detailed configuration of the observation apparatus of FIG. 1.

Referring to FIG. 3, an observation apparatus 300 may include an observation signal processing unit 301, a signal analyzing unit 305, a frequency determining unit 308, and a transmission signal processing unit 309. Here, the observation signal processing unit 301 may include an observation signal receiving unit 302, an analog-to-digital (A/D) converting unit 303, and a phase and amplitude adjusting unit 304. The signal analyzing unit 305 may include a physical quantity determining unit 306, and a storage unit 307. The transmission signal processing unit 309 may include a signal controlling unit 310, a power controlling unit 311. and a signal transmitting unit 312.

The transmission signal processing unit 309 may radiate a transmission signal to be used for observing an observation object. For example, the transmission signal may include a chirp signal.

In particular, the signal controlling unit 310 may generate and adjust a chirp signal corresponding to a periodical pulse signal radiated through a transmitting antenna. The signal controlling unit 310 may synchronize an observation interval of the adjusted chirp signal with an observation interval of an observation signal using a master clock. and synchronize a phase of the adjusted chirp signal with a phase of the observation signal using the master clock.

In this instance, the observation signal may include a signal received when the chirp signal is reflected by the observation object. The signal controlling unit 310 may perform the synchronization using the master clock in order to distinguish the transmitted chirp signal from the received observation signal.

The power controlling unit 311 may control a transmission power of the chirp signal of which the phase and the observation interval are synchronized.

The signal transmitting unit 312 may radiate the power-amplified chirp signal through the transmitting antenna into the air. As an example, in order to observe the observation object occurring in the ocean, the signal transmitting unit 312 may transmit the chirp signal toward the ocean. As another example, in order to observe the observation object occurring in the atmosphere, the signal transmitting unit 312 may transmit the chirp signal in a direction of the observation object occurring in the atmosphere.

The observation signal receiving unit 302 may receive an observation signal indicating a physical phenomenon of the observation object, through a plurality of antennas. For example, the observation signal receiving unit 302 may receive the observation signal through the receiving antennas composed in a form of an array of four. eighteen, twenty-four antennas, and the like.

In this instance, the observation signal receiving unit 302 may receive an observation signal corresponding to a transmission signal radiated at every observation interval. For example, the observation signal receiving unit 302 may receive, at every observation interval, an observation signal sensed by a sensor apparatus positioned around the observation object occurring in the ocean or the atmosphere.

The A/D converting unit 303 may convert the received observation signal into a digital signal.

In this instance, the A/D converting unit 303 may perform demodulation by comparing the transmission signal radiated by the signal transmitting unit 312 and the observation signal received by the observation signal receiving unit 302, and convert the demodulated observation signal into a digital signal.

The phase and amplitude adjusting unit 304 may adjust an amplitude and a phase of the observation signal converted into the digital signal.

For example, the phase and amplitude adjusting unit 304 may perform signal processing with respect to the observation signal converted into the digital signal, using a high pass filter, a low pass filter, a band pass filter, or the like.

The phase and amplitude adjusting unit 304 may adjust a phase and an amplitude of the filtered observation signal.

For example, the phase and amplitude adjusting unit 304 may adjust the amplitude of the observation signal for the amplitude of the filtered observation signal to be uniform. Similarly, the phase and amplitude adjusting unit 304 may adjust the phase of the observation signal for the phase of the filtered observation signal to be uniform. The phase and amplitude adjusting unit 304 may perform a fast Fourier transform (FFT) with respect to the observation signal of which the amplitude is adjusted. The phase and amplitude adjusting unit 304 may adjust the phase of the FFT-converted observation signal to be uniform, using the phase of the transmitted chirp signal.

The phase and amplitude adjusting unit 304 may store the observation signal of which the amplitude and the phase are adjusted, in the storage unit 307.

The physical quantity determining unit 306 may determine a physical quantity of the observation object, by analyzing the adjusted phase and amplitude of the observation signal.

For example. the physical quantity determining unit 306 may generate beam-forming information, by analyzing the adjusted phase and amplitude of the observation signal. In this instance, beam-forming may be performed by adjusting a length of a line along which the observation signal received through the receiving antennas is transferred. Accordingly, the physical quantity determining unit 306 may generate the beam-forming information by performing the beam-forming.

The physical quantity determining unit 306 may determine the physical quantity of the observation object, using the beam-forming information and a data analysis algorithm. Here, the physical quantity of the observation object may include a velocity, a density, a direction, a height of the observation object, a distance from the observation object, and the like.

The physical quantity determining unit 306 may store the determined physical quantity of the observation object in the storage unit 307. The physical quantity determining unit 306 may transfer the physical quantity of the observation object to the frequency determining unit 308. In this instance, the physical quantity determining unit 306 may transmit the physical quantity of the observation object, to a central management center (not shown).

The frequency determining unit 308 may determine whether an observation frequency is to be changed, based on the physical quantity of the observation object.

For example, the frequency determining unit 308 may determine whether the observation frequency is to be changed, based on at least one of a distance from the observation object, a height of the observation object, and a change in the physical quantity. In this instance, when the change in the physical quantity is to be used, the frequency determining unit 308 may determine whether the physical quantity is changed, by comparing a physical quantity of the observation object determined at a previous observation interval to a physical quantity of the observation object determined at a current observation interval.

Here, an operation of determining whether the physical quantity of the observation object is changed, and an operation of determining whether the observation frequency is to be changed may be identical to the description regarding the frequency determining unit 204 of FIG. 2 and thus, a repeated description will be omitted for conciseness.

The frequency determining unit 308 may transmit the changed or maintained observation frequency to the central management center.

In this instance, when the observation frequency is changed, the signal transmitting unit 312 may radiate the transmission signal, using the changed observation frequency.

As described above, the observation apparatus 300 may maintain or automatically change the observation frequency based on the physical quantity of the observation object, thereby expanding an observation range and increasing an observation precision. For example, when the physical quantity of the observation object is determined using the observation signal received through twenty-four receiving antennas, the observation apparatus 300 may secure a maximum of observation range of 180 degrees and 200 kilometers (km) from the observation apparatus 300 and secure an observation precision of 1 degree to 2 degrees. Here, the observation precision may be represented by a beam resolution.

Although the observation apparatus of FIGS. 2 and 3 includes a signal analyzing unit configured to determine a physical quantity of an observation object using a data analysis algorithm, the signal analyzing unit may be included in a server apparatus (not shown).

In this instance, the server apparatus may be connected to the observation apparatus over a network through Ethernet, and the like. The signal analyzing unit may receive beam-forming information from the observation apparatus over the network, and determine the physical quantity of the observation object using the data analysis algorithm.

The signal analyzing unit may transmit, over the network, the physical quantity of the observation object to a frequency determining unit included in the observation apparatus. In this instance, the signal analyzing unit may transmit the physical quantity of the observation object to a central management center, for example, a weather center, and the like.

Figure 4:
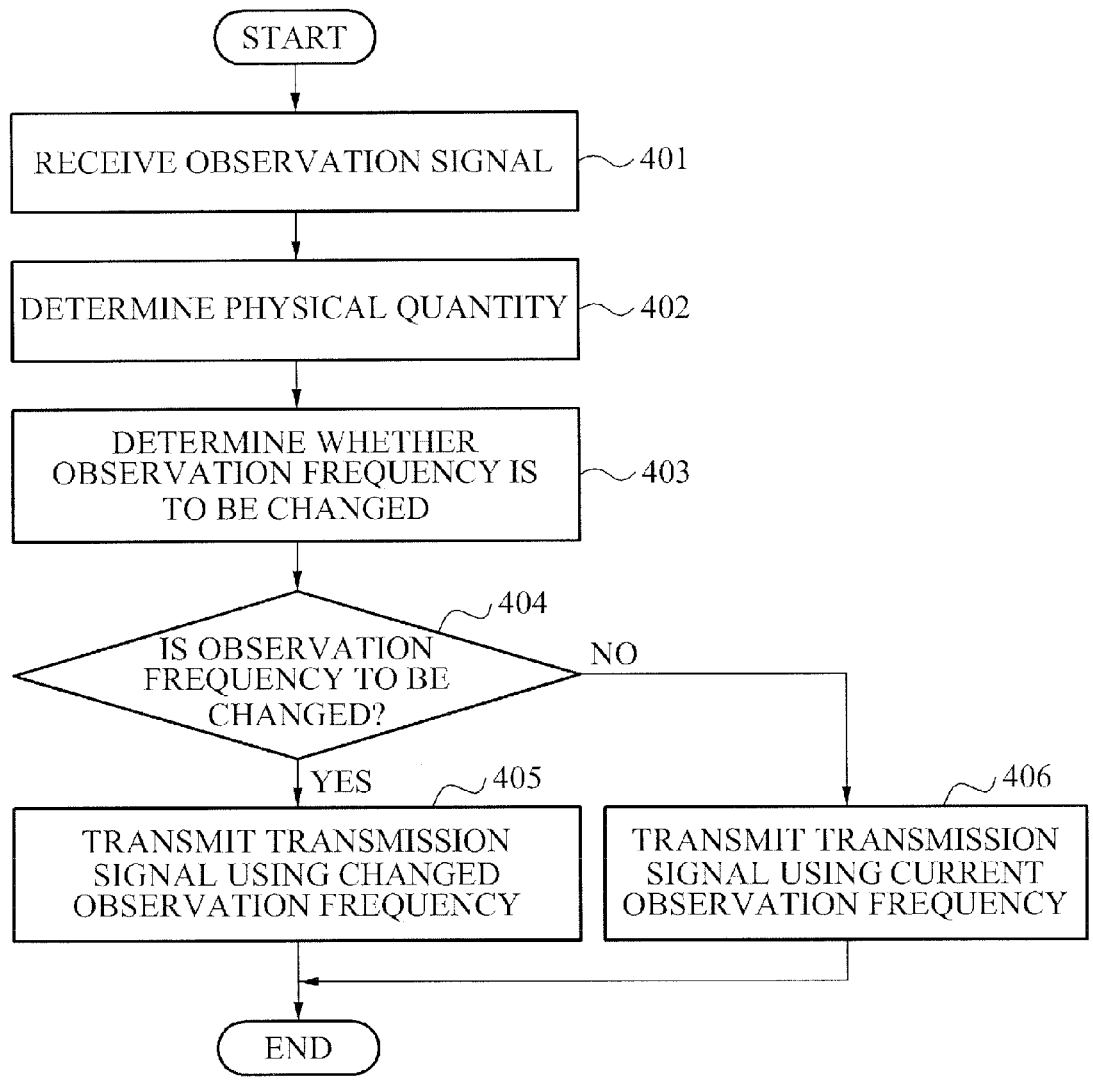
FIG. 4 is a flowchart illustrating a method of determining whether a frequency is to be changed, by observing an observation object in the observation apparatus of FIG. 1.

FIG. 4 is a flowchart illustrating a method of determining whether a frequency is to be changed, by observing an observation object in the observation apparatus 100 of FIG. 1.

In operation 401, the observation apparatus 100 may receive an observation signal indicating a physical phenomenon of the observation object. Here, the observation signal may include an intensity of a frequency signal sensed by a sensor apparatus, a pattern of the frequency signal, and the like.

For example, the observation apparatus 100 may radiate, into the ocean or the atmosphere, a transmission signal to be used for observing the observation object, for example, a tsunami, a gale, a regional torrential rain, a typhoon, and the like, occurring in the ocean or the atmosphere. The sensor apparatus positioned around the observation object may sense the observation object using the transmission signal, and transmit a sensed observation signal to the observation apparatus 100. The observation apparatus 100 may receive the observation signal through a plurality of antennas.

In this instance, the observation apparatus 100 may radiate the transmission signal at every predetermined observation interval. Accordingly, the observation apparatus 100 may receive the observation signal at every observation interval.

In operation 402, the observation apparatus 100 may determine a physical quantity of the observation object, using the received observation signal.

For example, the observation apparatus 100 may generate beam-forming information by analyzing an amplitude and a phase of the observation signal. Here, the beam-forming information may include an intensity of the frequency signal sensed by the sensor apparatus, a pattern of the frequency signal, and the like. The observation apparatus 100 may determine the physical quantity of the observation object, using the beam-forming information and a data analysis algorithm. In this instance, since the observation signal is received at every observation interval, the observation apparatus 100 may determine the physical quantity of the observation object at every observation interval. Here, the physical quantity of the observation object may include a velocity, a density, a direction, a height of the observation object, a distance from the observation object, and the like.

The observation apparatus 100 may store the determined physical quantity of the observation object, and transmit the physical quantity of the observation object to a central management center, for example, a weather center, and the like.

In operation 403, the observation apparatus 100 may determine whether an observation frequency is to be changed, based on the physical quantity of the observation object.

For example, the observation apparatus 100 may determine whether the observation frequency is to be changed, based on at least one of the distance from the observation object, the height of the observation object, and a change in the physical quantity of the observation object which are included in the physical quantity of the observation object.

As an example, when the distance from the observation object is less than a reference distance, the observation apparatus 100 may determine the observation frequency is to be increased. In particular, when the observation object is positioned close to the observation apparatus 100, the observation apparatus 100 may change the observation frequency to a high frequency, thereby increasing an observation precision with respect to the observation object.

When the distance from the observation object is greater than or equal to the reference distance, the observation apparatus 100 may determine to maintain or lower the observation frequency. In particular, when the observation object is positioned far from the observation apparatus 100, the observation apparatus 100 may maintain the observation frequency or change the observation frequency to a low frequency, thereby expanding an observation range with respect to the observation object. For example, when the observation frequency is changed to a low frequency, the observation apparatus 100 may observe at least one observation object positioned within a maximum of 200 km distance from the observation apparatus 100.

As another example, when the height of the observation object is greater than or equal to a reference height, the observation apparatus 100 may determine the observation frequency be to increased. When the height of the observation object is less than the reference height, the observation apparatus 100 may determine to maintain or lower the observation frequency.

As still another example, the observation apparatus 100 may determine whether the physical quantity of the observation object is changed, based on the physical quantity determined at every observation interval. In this instance, when a difference between a physical quantity determined at a previous observation interval and a physical quantity determined at a current observation interval is within a predetermined margin of error, the observation apparatus 100 may determine that the physical quantity of the observation object is not changed. When it is determined that the physical quantity of the observation object is not changed, the observation apparatus 100 may determine to maintain the observation frequency, or to change the observation frequency to a low frequency.

When the difference between the physical quantity determined at the previous observation interval and the physical quantity determined at the current observation interval is out of the predetermined margin of error, the observation apparatus 100 may determine that the physical quantity of the observation object is changed. When it is determined that the physical quantity of the observation object is changed, the observation apparatus 100 may determine to increase the observation frequency to a high frequency.

As yet another example, when the distance from the observation object and the change in the physical quantity are used, the observation apparatus 100 may determine whether the physical quantity of the observation object is changed.

In this instance, when the distance from the observation object is less than the reference distance, and the physical quantity is changed, the observation apparatus 100 may change the observation frequency to a high frequency, thereby observing the observation object more precisely.

When the distance from the observation object is greater than or equal to the reference distance, and the physical quantity is changed, the observation apparatus 100 may maintain or increase the observation frequency.

When the distance from the observation object is less than the reference distance, and the physical quantity is not changed, the observation apparatus 100 may determine the observation frequency is to be increased.

When the distance from the observation object is greater than or equal to the reference distance, and the physical quantity is not changed, the observation apparatus 100 may determine to maintain or lower the observation frequency.

As further another example, when the height of the observation object is greater than or equal to the reference height, and the physical quantity is changed, the observation apparatus 100 may determine the observation frequency is to be increased in order to observe the observation object more precisely. In this instance, when the height of the observation object is less than the reference height, and the physical quantity is changed, the observation apparatus 100 may determine to maintain or increase the observation frequency.

When the height of the observation object is greater than or equal to the reference height, and the physical quantity is not changed, the observation apparatus 100 may determine the observation frequency is to be increased. In this instance, when the height of the observation object is less than the reference height, and the physical quantity is not changed, the observation apparatus 100 may determine to maintain or lower the observation frequency.

As still another example, when the distance from the observation object is greater than or equal to the reference signal, and the height of the observation object is greater than or equal to the reference height, the observation apparatus 100 may determine to increase the observation frequency. When the distance from the observation object is greater than or equal to the reference signal, and the height of the observation object is less than the reference height. the observation apparatus 100 may determine the observation frequency is to be increased. Similarly, when the distance from the observation object is less than the reference distance, and the height of the observation object is greater than the reference height, the observation apparatus 100 may determine the observation frequency is to be increased.

In this instance, when the distance from the observation object is less than the reference distance, and the height of the observation object is less than the reference height, the observation apparatus 100 may determine to maintain or lower the observation frequency.

As yet another example, 1) when the physical quantity is not changed, the distance from the observation object is less than the reference distance, and the height of the observation object is greater than or equal to the reference height, 2) when the physical quantity is not changed, the distance from the observation object is greater than or equal to the reference distance, and the height of the observation object is less than the reference height, or 3) when the physical quantity is not changed, the distance from the observation object is greater than or equal to the reference distance, and the height of the observation object is greater than or equal to the reference height, the observation apparatus 100 may determine the observation frequency is to be increased, and change the observation frequency to a high frequency.

In this instance, when the physical quantity is not changed, the distance from the observation object is less than the reference distance, and the height of the observation object is less than the reference height, the observation apparatus 100 may determine to maintain or lower the observation frequency.

Similarly, 1) when the physical quantity is changed, the distance from the observation object is less than the reference distance, and the height of the observation object is greater than or equal to the reference height, 2) when the physical quantity is changed, the distance from the observation object is greater than or equal to the reference distance, and the height of the observation object is less than the reference height, or 3) when the physical quantity is changed, the distance from the observation object is greater than or equal to the reference distance, and the height of the observation object is greater than or equal to the reference height, the observation apparatus 100 may determine the observation frequency is to be increased.

When the physical quantity is changed, the distance from the observation object is less than the reference distance, and the height of the observation object is less than the reference height, the observation apparatus 100 may determine to maintain or increase the observation frequency. As described above, when the physical quantity is changed, the observation apparatus 100 may maintain the observation frequency, rather than lowering the observation frequency, or may increase the observation frequency based on a level of the change in the physical quantity.

When the observation frequency is determined to be changed, in operation 404, the observation apparatus 100 may transmit a transmission signal using a changed observation frequency, in operation 405.

For example, when the observation frequency is determined to be changed to a high frequency, the observation apparatus 100 may transmit the transmission signal using the high frequency. When the observation frequency is determined to be changed to a low frequency, the observation apparatus 100 may transmit the transmission signal using the low frequency.

In this instance, when the observation frequency is determined to not be changed, but rather to be maintained, in operation 404, the observation apparatus 100 may transmit the transmission signal using a current observation frequency, in operation 406.

Although an operation of changing an observation frequency from a high frequency to a low frequency, changing the observation frequency from a low frequency to a high frequency, or maintaining the observation frequency, based on a physical quantity of an observation object, has been described with reference to FIGS. 1 through 4, the operation is provided as an example. The observation apparatus 100 may classify an observation frequency band into a plurality of frequency bands, and change an observation frequency.

For example, the observation apparatus 100 may classify an observation frequency band of 5 MHz to 15 MHz into five frequency bands, for example, 1) a frequency band in a range of 5 MHz to 7 MHz, 2) a frequency band in a range of 7 MHz to 9 MHz, 3) a frequency band in a range of 9 MHz to 11 MHz, 4) a frequency band in a range of 11 MHz to 13 MHz, and 1) a frequency band in a range of 13 MHz to 15 MHz. In this instance, when a physical quantity is determined using the observation frequency in a range of 5 MHz to 7 MHz at a previous observation interval, and the observation frequency is determined to be increased, the observation apparatus 100 may increase the observation frequency to one of 2) the frequency band in a range of 7 MHz to 9 MHz, 3) the frequency band in a range of 9 MHz to 11 MHz, 4) the frequency band in a range of 11 MHz to 13 MHz, and 1) the frequency band in a range of 13 MHz to 15 MHz. Similarly, the observation apparatus 100 may decrease the observation frequency to one of the five classified observation frequency bands, based on the physical quantity of the observation object.

Although an operation of observing a single observation object occurring in the ocean or the atmosphere and determining a physical quantity of the observation object has been described above, the operation is provided as an example. The observation apparatus 100 may observe at least one observation object, and determine a physical quantity of each observation object.

For example, a data analysis algorithm may be programmed to determine, for each observation object, a physical quantity of an observation object, for example, a tsunami, a gale, a typhoon, a regional torrential rain, and the like. The observation apparatus 100 may apply an observation signal and a category of an observation object indicating whether the observation object corresponds to a tsunami or a gale, as an input parameter of the data analysis algorithm, thereby determining a physical quantity of an observation object corresponding to each category.

According to exemplary embodiments of the present invention, an observation apparatus may expand a range for observing a change in a state of an observation object occurring in an ocean and the atmosphere, by varying an observation frequency.

According to exemplary embodiments of the present invention, an observation apparatus may more precisely observe a change in a state of an observation object, by varying an observation frequency.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An observation apparatus, comprising
an observation signal receiving unit to receive an observation signal indicating a physical phenomenon of an observation object;
a physical quantity determining unit to determine a physical quantity of the observation object, using the observation signal; and
a frequency determining unit to determine whether an observation frequency is to be changed, based on the physical quantity of the observation object;
wherein the frequency determining unit maintains the observation frequency, or changes the observation frequency to a high frequency or a low frequency based on at least
a distance from the observation apparatus to the observation object,
a height of the observation object, and
a change in the physical quantity of the observation object.

2. The observation apparatus of claim 1, wherein the frequency determining unit increases an observation precision, or expands an observation range of the observation object by changing the observation frequency.

3. An observation method comprising:
receiving an observation signal indicating a physical phenomenon of an observation object;
determining a physical quantity of the observation object, using the observation signal; and
determining whether an observation frequency is to be changed, based on the physical quantity of the observation object;
wherein the determining of whether the observation frequency is to be changed comprises maintaining the observation frequency, or changing the observation frequency based on at least a distance from the observation apparatus to the observation object, a height of the observation object, and a change in the physical quantity of the observation object.

4. The observation method of claim 3, wherein the determining of whether the observation frequency is to be changed comprises increasing an observation precision with respect to the observation object by changing the observation frequency to a high frequency, or expanding an observation range of the observation object by changing the observation frequency to a low frequency.

5. The apparatus of claim 1 wherein the frequency determining unit compares the distance from the observation object to a predetermined reference distance based on a value indicating a distance from the observation object.

6. The apparatus of claim 5 wherein the observation object is a tsunami, or a tidal wave.

7. The apparatus of claim 5 wherein when the distance from the observation object is less than the predetermined reference distance, the frequency determining unit increases the observation frequency; and
wherein when the distance from the observation object is greater than or equal to the predetermined reference distance, the frequency determining unit lowers the observation frequency.

8. The apparatus of claim 7 wherein the frequency determining unit compares the height of the observation object to a predetermined reference height.

9. The apparatus of claim 8 wherein the frequency range is equal to or greater than 5 MHz and equal to or less than 15 Mhz.

10. An observation apparatus, comprising:
an observation signal processing unit;
a physical quantity determining unit;
a frequency determining unit; and
a transmission signal processing unit comprising:
a signal controlling unit, and
a signal transmitting unit;
wherein the observation signal processing unit receives an observation signal indicating a physical phenomenon occurring in the ocean or the atmosphere of an observation object sensed by a sensor apparatus, converts the observation signal into a digital signal, and adjusts an amplitude and a phase of the observation signal converted into a digital signal;
wherein the physical quantity determining unit determines a physical quantity of the observation object by analyzing the adjusted phase and amplitude of the observation signal and the physical quantity includes at least a velocity and a density;
wherein the frequency determining unit determines whether an observation frequency is to be changed based on the physical quantity of the observation object;
wherein the signal controlling unit generates and adjusts a chirp signal corresponding to a periodical pulse signal radiated through a transmitting antenna; and
wherein the signal transmitting unit transmits the chirp signal toward either the ocean or the atmosphere.

11. The apparatus of claim 10 wherein the signal controlling unit synchronizes an observation interval of the adjusted chirp signal with an observation interval of an observation signal using a master clock; and
synchronizes a phase of the adjusted chirp signal with a phase of the observation signal using the master clock.

12. The apparatus of claim 10 wherein the observation signal includes a signal received when the chirp signal is reflected by the observation object.

13. The apparatus of claim 10 wherein the signal processing unit further comprises:
a power controlling unit to control transmission power of the chirp signal of which the phase and the observation interval are synchronized.

14. The apparatus of claim 13 wherein the signal transmitting unit transmits the chirp signal toward the ocean.

15. The apparatus of claim 13 wherein the signal transmitting unit transmits the chirp signal in a direction of the observation object occurring in the atmosphere.

* * * * *